(12) United States Patent
Vasquez, Jr.

(10) Patent No.: US 6,553,877 B2
(45) Date of Patent: *Apr. 29, 2003

(54) VIBRATION ATTENUATOR

(76) Inventor: Andrew R. Vasquez, Jr., P.O. Box 3268, Rancho Cordova, CA (US) 95741

( * ) Notice: Subject to any disclaimer, the term of this patent is extended or adjusted under 35 U.S.C. 154(b) by 1 day.

This patent is subject to a terminal disclaimer.

(21) Appl. No.: 09/812,861

(22) Filed: Mar. 19, 2001

(65) Prior Publication Data

US 2001/0011490 A1 Aug. 9, 2001

Related U.S. Application Data

(63) Continuation-in-part of application No. 09/378,133, filed on Aug. 19, 1999, now Pat. No. 6,227,085.

(51) Int. Cl.[7] .............................. B23B 5/04; B23B 25/00
(52) U.S. Cl. .............................. 82/163; 82/112; 74/574
(58) Field of Search .......................... 82/112, 163, 162, 82/904; 408/17, 143; 409/141; 74/574

(56) References Cited

U.S. PATENT DOCUMENTS

| | | | |
|---|---|---|---|
| 3,691,878 A | | 9/1972 | Mitchell |
| 3,710,661 A | | 1/1973 | Mitchell |
| 4,178,819 A | | 12/1979 | Mahon |
| 4,266,454 A | | 5/1981 | Mitchell et al. |
| 4,478,116 A | | 10/1984 | Fuller |
| 4,510,828 A | | 4/1985 | Bogaerts et al. |
| 4,523,499 A | | 6/1985 | Aldridge, Jr. |
| 4,531,434 A | | 7/1985 | Vasquez |
| 5,224,303 A | | 7/1993 | Baldwin |
| 5,297,460 A | | 3/1994 | Hartman et al. |
| 5,765,457 A | | 6/1998 | Meyer et al. |
| 5,937,499 A | * | 8/1999 | Austin et al. ............. 188/18 R |
| 6,227,085 B1 | * | 5/2001 | Vasquez, Jr. ................. 74/574 |
| 6,363,821 B1 | * | 4/2002 | Greenwald et al. .......... 82/1.11 |

* cited by examiner

Primary Examiner—Henry Tsai
(74) Attorney, Agent, or Firm—Fulwider Patton Lee & Utecht, LLP

(57) ABSTRACT

An improved vibration attenuator for reducing undesired vibrations generated by cutter bits being drawn across the faces of a rotating brake rotor. The attenuator has friction pads with engagement members that extend therefrom which are configured to cause force to be exerted on the sides of fasteners that affix the cutter bits to the cutter arms in a direction parallel to the surface being machined and perpendicular to the direction of rotation of the rotor.

6 Claims, 2 Drawing Sheets

VIBRATION ATTENUATOR

This application is a continuation-in-part of U.S. patent application Ser. No. 09/378,133 filed Aug. 19, 1999, now U.S. Pat. No. 6,227,085.

BACKGROUND OF THE INVENTION

The present invention relates to a vibration attenuator for attenuating the vibration caused during the machining or resurfacing of a disc brake rotor by a pair of cutter bits.

After a period of use the faces of disc brake rotors of automobiles, trucks and the like become worn unevenly. A characteristic pattern of circumferentially arranged ridges and valleys develops which interferes with optimum braking action. Additionally the rotors may become warped which could also have an adverse effect on the vehicle's braking capability as well as the undesirable effect of transmitting a pulsing to the brake pedal. The grooves and/or warpage must be removed by resurfacing or machining the face of the rotor. Typically, this is done by mounting the rotor on an arbor assembly for rotation by a brake rotor lathe. A pair of cutter bits are moved by the lathe carriage across the faces of the rotating rotor to cut enough of the material away to render the faces flat or planar. During this operation the cutter bits and rotor typically produce loud, screeching noises which are not only unpleasant for the lathe operator and others in the vicinity, but the accompanying vibrations of the rotor and bits can adversely affect the accuracy of the machining. The vibration may also have an adverse effect on the bits causing them to over heat and wear prematurely.

Various means have been advanced to attenuate or eliminate such vibrations. One system employs damping pads designed to bear against the opposite faces of the rotor in a position out of the way of the cutter bits. The pads are carried by a relatively complex mounting structure which is secured to the brake lathe. Precise adjustment of the position of the pads is required, and an elaborate linkage arrangement is provided to accomplish this. The arrangement is relatively complex and costly, requires subtle adjustments, and is only partially effective in damping the machining noises.

Another system of the prior art utilizes a resilient band adapted to be stretched and placed about the circumference of the rotor. One must purchase a set of such bands to accommodate each of the various sizes of rotor to be machined. The system is unsatisfactory for that reason, and also because the vibration attenuation is not always adequate.

Yet another arrangement of the prior art employs a U-shape rod or handle which mounts a pair of friction resistant pads at its extremities. The pads are placed in position to bear against the opposite faces of the rotor to thereby damp rotor vibration. However, the pads are not effective to attenuate cutter bit vibrations.

U.S. Pat. No. 4,531,434 describes a device wherein two friction pads are biased against the rotor surfaces while the rotation of the rotors then forces the pads against the cutter arms and bits. Pins projecting from the pads engage the cutter arms to automatically maintain the pads in radial position relative to the arms or bits as they are gradually drawn across the faces of the rotor. However, its use in many lathe configurations is compromised in that the cutter bits must be extended an inordinate distance from the cutter arms in order to provide direct access to the bits by the pads. Although the resulting direct contact of the bit enhances the attenuating effect, the extension of the bit substantially offsets such effect as significantly greater vibration is being generated. Additionally, the handle of the device described in the patent interferes with the lathe carriage of many lathe systems which forces the pads to be angled relative to the bits and therefore further diminishes their efficacy. Further, in certain brake rotor lathe configurations, the cutter bit is attached to the cutter arm by a fastener that interferes with the direct contact of the bits by the attenuator pads as the pads are driven towards the bits by the rotation of the rotor. While such attenuator mechanism is fairly effective in attenuating the vibration, further improvement is desirable.

SUMMARY OF THE INVENTION

The vibration dampener of the present invention improves over previously known devices in that it is configured in such a manner so as to cause the force exerted on a brake rotor lathe's cutter bits to be oriented in a direction substantially perpendicular to the direction of rotation of the workpiece. Moreover, the device of the present invention provides for a substantial amount of the force that is generated by the rotation of the rotor against the device to be redirected into such perpendicular direction. The device functions in cooperation with a brake rotor lathe that has its cutter bits held in place on their respective cutter arms by a fastener with a raised head and wherein the cutter arms have an upwardly extending angled surface adjacent the fastener. By simultaneously engaging the angled surface and the side of the raised fastener, the attenuator is able to transfer a substantial amount of the force exerted by the rotating rotor on the device to the fastener and onto the bit in the appropriate direction.

An attenuator constructed in accordance with the present invention generally includes two friction pads fitted to two arms that are arranged in an opposed relationship wherein a spring extending between the arms biases the arms and hence the two pads towards one another so as to grasp a workpiece being rotated therebetween. The two arms are joined at their proximal ends to define a handle. More particularly, each of the friction pads includes a protruding engagement nub that is configured for simultaneously contacting the side of raised head of a fastener serving to affix the cutter bit to the cutter arm as well as the angled portion of the cutter arm. The handle is configured to enable the engagement nub to engage the side of the fastener and the angled surface of the cutter arm at the appropriate angle.

These and other features and advantages of the present invention will become apparent from the following detailed description of a preferred embodiment which, taken in conjunction with the accompanying drawings, illustrates by way of example the principles of the invention.

DETAILED DESCRIPTION OF THE PREFERRED EMBODIMENTS

The attenuator device of the present invention is pinched onto a brake rotor during its resurfacing to reduce the noise that would otherwise be generated, to enhance the effectiveness of the machining operation and to extend the service life of the cutter bits.

Figure 1:
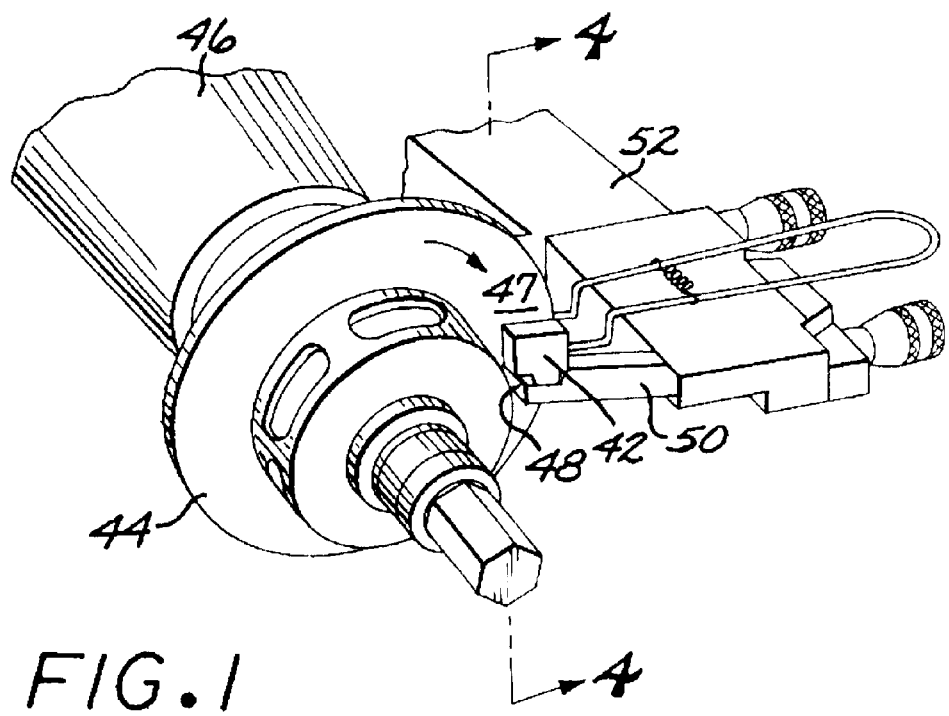
FIG. 1 is a perspective view of the attenuator device in position on a brake rotor lathe.

FIG. 1 generally shows the device 42 of the present invention in position on a brake rotor 44 during a machining operation. The brake rotor is being rotated by the lathe arbor 46 in direction 47 and cutter bits 48 affixed to ends of cutter arms 50 are gradually drawn across the face of the rotor by the lathe's carriage 52 in a radially outward direction. The two cutter bits are held against the two faces of the rotor such that both faces of the rotor are simultaneously machined in a single machining operation.

Figure 2:
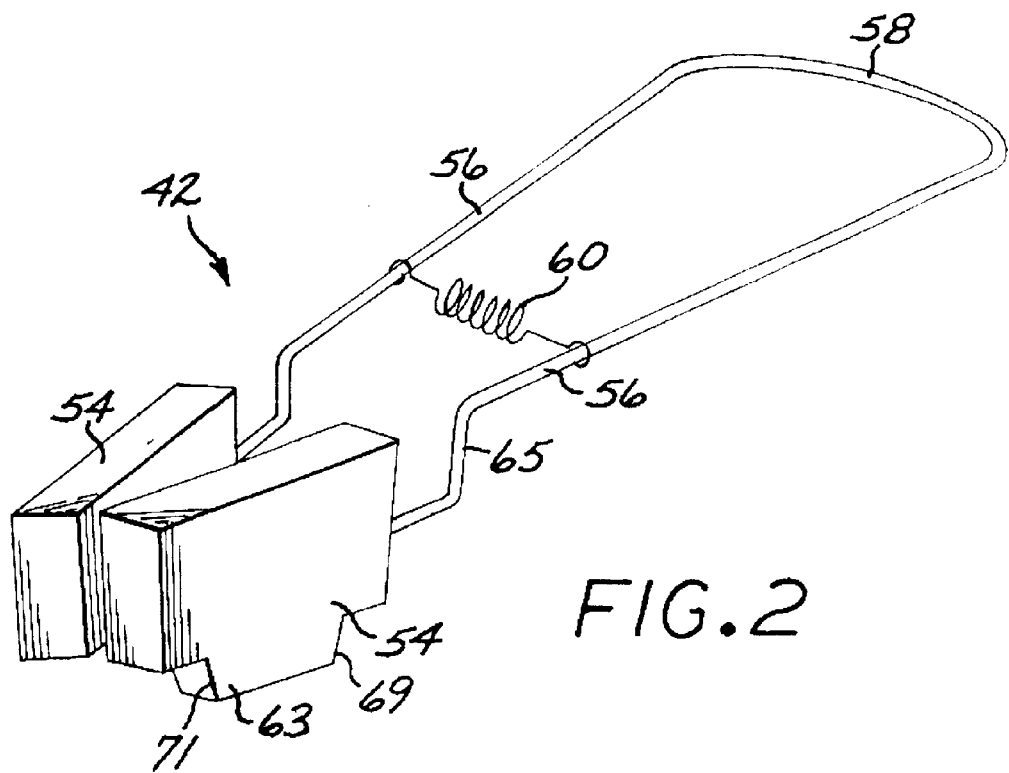
FIG. 2 is an enlarged perspective view of the device of the present invention.

FIG. 2 illustrates the attenuator 42 of the present invention. The device consists of a pair of friction pads 54 attached to a pair of arms 56 that are joined at their proximal ends to define a handle 58. A tension spring 60 biases the arms and pads towards one another. Extending from the bottom of the pads are engagement nubs 63 each having a proximal edge 69 and a distal edge 71.

Figure 3:
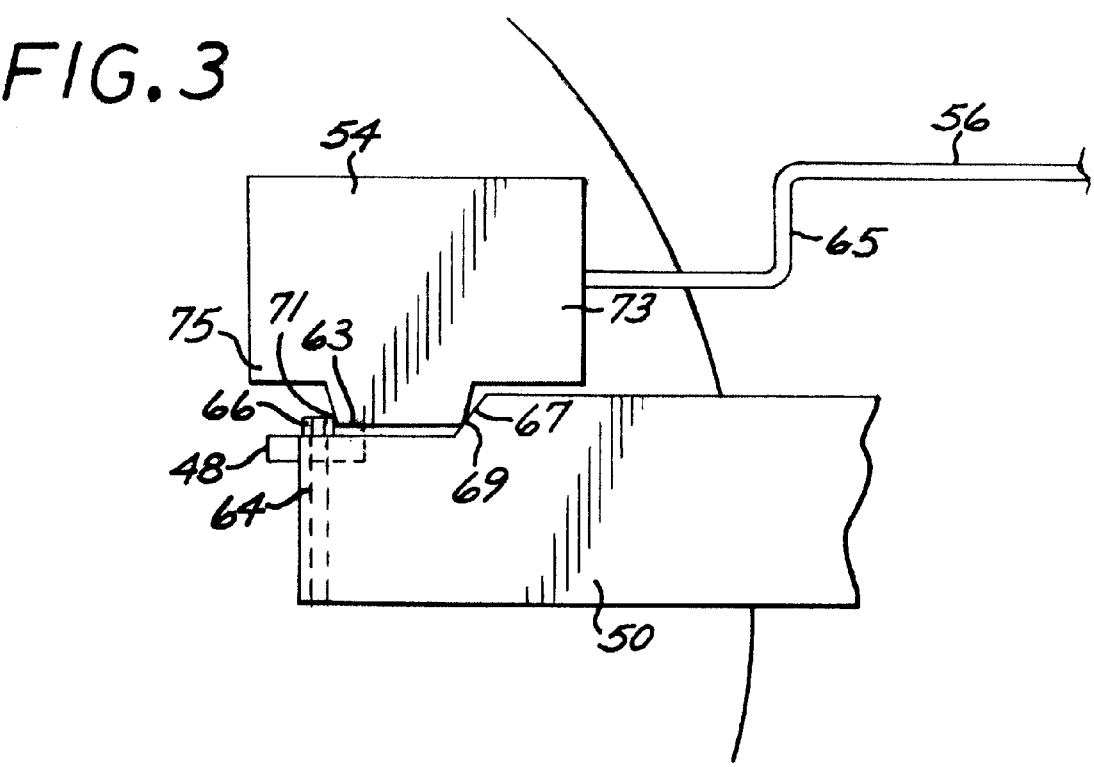
FIG. 3 is an enlarged side view of the attenuator in position on the lathe.

FIG. 3 illustrates the interaction of the attenuator with the lathe components. The cutter bit 48 is attached to the cutter arm 50 by a fastener 64 that extends through the bit and is threaded into the arm. The fastener has a raised head 66 such as for example an Allen head. The cutter arm has an angled surface 67 proximally adjacent to the fastener which extends upwardly from the level of the fastener head. The engagement nub is shaped and dimensioned to simultaneously engage the angled surface as well as the fastener head wherein the proximal edge 69 of the nub engages a point along the angled surface while the distal edge 71 of the nub engages the side of the fastener head. The pad is shaped such that its proximal end 73 avoids contact with any portion of the cutter arm while its distal end 75 avoids contact with the top of the fastener head. The nub may be positioned anywhere along the length of the pad including a configuration wherein the distal edge of the nub is aligned with the distal end of the pad, a configuration wherein the proximal edge of the nub is aligned with proximal end of the pad or any intermediate position such as is shown in the illustrated embodiment. Alternatively, the length of the entire pad may conform to the length of the nub such that the proximal and distal ends of the pad are aligned with proximal and distal edges of the nub. The attenuator arms 56 are shaped to similarly allow the engagement nub to properly contact the angled surface of the cutter arm as well as the fastener head. Such shaping may take the form of an offset 65 in the handle to allow the proximal end of the handle to clear any lathe components that would otherwise cause the undesirable angling of the pads 54 and hence the engagement nubs 63 vis-a-vis the fastener head 66 and angled cutter arm surface 67.

Figure 4:
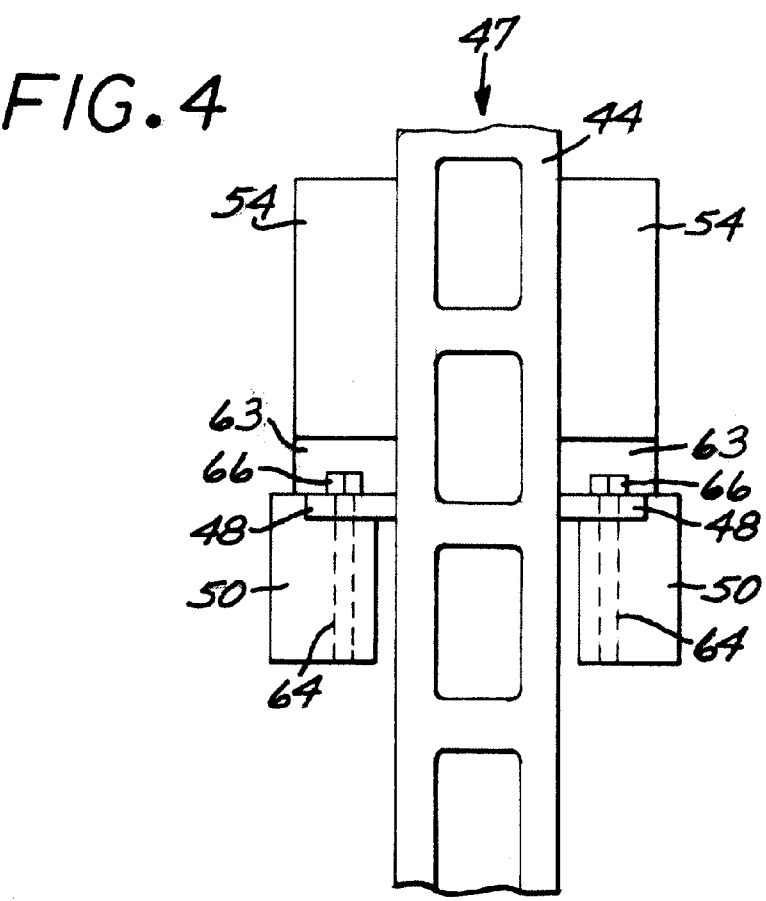
FIG. 4 is an enlarged cross-sectional view taken along lines IV—IV of FIG. 1.

FIG. 4 is cross-sectional view taken through the rotor 44 and radially outwardly to illustrate the relationship of the pads 54, and more specifically, the engagement nubs 63 with respect to the head 66 of fastener 64. While the rotation of the rotor in direction 47 causes the pads to be driven against arms 50, the gradual movement of the lathe carriage 52 in a radially outward direction causes the fastener heads 66 to be driven against the engagement nubs 63. Additionally, the rotation of the rotor causes the proximal edge 69 of the nub 63 to be forced against the angled surface 67 of the cutter arm 50 wherein the angle of the surface causes such force to be redirected and come to bear against the side of the fastener heads via the distal edge 71 of the nub. Resistance by the pads being urged against the rotating rotor generates the resistive force that serves to attenuate the undesired vibration.

The pads 54 are each initially about ⅜" each thick and are formed of brake lining material. The engagement nubs are an integral part of the pad extend downwardly approximately ⅜". The arms 56 and handle 58 are formed of stainless steel wire and extend about 7 ½" from the pads. The offset 65 in the handle is about ⅜". An attenuator of the present invention with such dimensions is ideally suited for use with a brake rotor lathe sold under the trademark PRO-CUT.

The attenuator device 42 of the present invention is fabricated by cutting brake lining material to size to form the pads 54 with integral engagement nubs 63. Slightly undersized holes are then drilled in the edges to receive the arms 56. The components are forced together and are held in place by the resulting friction fit. The handle is then dipped in a rubber or other suitable resilient plastic material that provides an non-slip surface. The spring 60 is clipped into place to complete the assembly process.

In use, the attenuator device of the present invention is pinched onto the rotor being turned by the lathe. The friction generated by the pads 54 being forced against the rotor 44 surfaces by spring 60 causes the device to be forced in the direction of rotation (47) until the proximal edges 69 of the engagement nubs 63 make contact with the angled surfaces 67 of the cutter arms 50. The angled nature of the surface causes the pad to be deflected such that the distal edge of the nub bears against the side of the raised fastener head 66. The shape of the pads 54 and the shape of the handle 58 facilitate the simultaneous engagement of the fastener heads and the angled surfaces by the nubs. The force with which the nub is driven against the cutter arm by the rotation of the rotor is thereby redirected against the side of the fastener. The force by which the lathe carriage 52 is gradually drawn radially outwardly additionally comes to bear against the side of the raised fastener heads as the resistance of the pads against the rotor creates a resistive force oriented perpendicular to the direction of rotation of the workpiece. The total force applied to the side of the fastener head is transferred to the cutter bit and serves to attenuate the undesired vibrations.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A vibration attenuator for attenuating vibrations generated during the resurfacing of a brake rotor by a brake rotor lathe, wherein cutter bits supported by cutter arms are gradually drawn across the brake rotor surfaces as such rotor is being rotated, wherein each of such cutter bits is affixed to a cutter arm by a fastener with a raised head and wherein such cutter arm has an angled surface proximally adjacent to the fastener head and extending upwardly therefrom, comprising:

a pair of friction pads each having an engagement nub protruding therefrom configured and dimensioned for simultaneously engaging the angled surface of the cutter arm and the side of said raised head; and spring means for biasing said pads against said rotor.

2. The vibration attenuator of claim 1, wherein said pads are shaped such that no part other than the engagement nub engages any portion of said cutter arm nor said raised fastener head.

3. The vibration attenuator of claim 1, further comprising arms extending from said pads to which said spring means is attached, wherein said arms are shaped so as to enable said nubs to simultaneously engage said angled surface of the cutter arm and the side of said fastener head.

4. The vibration attenuator of claim 1, wherein each of said nubs is an integral part of the respective pad.

5. The vibration attenuator of claim 1, wherein said pad and nub are formed of a single piece of brake lining material.

6. The vibration attenuator of claim 1, wherein each of said engagement nubs has a proximal edge and a distal edge and wherein said proximal edge is configured to engage a point along said angled surface of said cutter.

* * * * *